United States Patent
Dombroski et al.

(10) Patent No.: US 8,612,421 B2
(45) Date of Patent: Dec. 17, 2013

(54) EFFICIENT PROCESSING OF RELATIONAL JOINS OF MULTIDIMENSIONAL DATA

(75) Inventors: Matthew Dombroski, Lancaster, MA (US); Caleb Welton, Malden, MA (US); Ekrem Soylemez, Arlington, MA (US); Albert A. Hopeman, IV, Arlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1662 days.

(21) Appl. No.: 10/944,169

(22) Filed: Sep. 16, 2004

(65) Prior Publication Data
US 2005/0033741 A1    Feb. 10, 2005

Related U.S. Application Data

(63) Continuation-in-part of application No. 10/841,941, filed on May 6, 2004, now Pat. No. 8,200,612.

(60) Provisional application No. 60/469,032, filed on May 7, 2003.

(51) Int. Cl.
*G06F 7/00* (2006.01)
*G06F 17/30* (2006.01)

(52) U.S. Cl.
USPC .......................... 707/713; 707/721; 707/769

(58) Field of Classification Search
USPC .......................................................... 707/3
See application file for complete search history.

(56) References Cited

U.S. PATENT DOCUMENTS

| | | |
|---|---|---|
| 5,359,724 A | 10/1994 | Earle |
| 5,367,675 A | 11/1994 | Cheng et al. |
| 5,799,300 A | 8/1998 | Agrawal et al. |
| 5,848,408 A | 12/1998 | Jakobsson |
| 5,905,985 A | 5/1999 | Malloy et al. .................. 707/100 |
| 5,918,232 A | 6/1999 | Pouschine et al. |

(Continued)

FOREIGN PATENT DOCUMENTS

WO    WO 03/012698 A2    2/2003

OTHER PUBLICATIONS

Analysis Services Programming (SQL Server 2000), Passing Queries from SQL Server to a Linked Analysis Server, Microsoft MSDN, Mar. 31, 2002, 3 pgs.

(Continued)

*Primary Examiner* — Christyann Pulliam
*Assistant Examiner* — Charles Adams
(74) *Attorney, Agent, or Firm* — Hickman Palermo Truong Becker Bingham Wong LLP

(57) ABSTRACT

Predicate abduction involves identifying, from a database statement, predicates on attributes of dimensional data, and applying those predicates to corresponding measure data so that only measure values are fetched and returned for dimension values that satisfy the predicate. In contrast to processing joins of relational data, the subset of the measure data is determined without needing to join a fact table with a dimension table and, therefore, without processing every fact record to determine which measure values are associated with records that satisfy the condition. Buffer reuse involves storing in buffers the "domains" of queries executing on multidimensional data. Responsive to detecting that execution of a database statement requires multiple iterations of extracting the same multidimensional data, the data is extracted during the first iteration and stored in a buffer so that, for each subsequent iteration, the buffer-stored data is accessed rather than re-extracting the data.

40 Claims, 3 Drawing Sheets

(56) References Cited

U.S. PATENT DOCUMENTS

| | | | |
|---|---|---|---|
| 5,926,818 A | 7/1999 | Malloy | 707/100 |
| 5,937,408 A | 8/1999 | Shoup et al. | |
| 5,940,818 A | 8/1999 | Malloy et al. | 707/2 |
| 5,943,668 A | 8/1999 | Malloy et al. | 707/3 |
| 5,943,677 A | 8/1999 | Hicks | |
| 5,978,796 A | 11/1999 | Malloy et al. | 707/3 |
| 6,014,614 A | 1/2000 | Herring et al. | |
| 6,108,657 A | 8/2000 | Shoup et al. | |
| 6,122,636 A | 9/2000 | Malloy et al. | 707/102 |
| 6,163,774 A | 12/2000 | Lore et al. | 707/2 |
| 6,205,447 B1 | 3/2001 | Malloy | 707/102 |
| 6,317,750 B1 | 11/2001 | Tortolani et al. | |
| 6,381,596 B1 * | 4/2002 | Bayer | 707/4 |
| 6,385,301 B1 | 5/2002 | Nolting et al. | |
| 6,385,604 B1 * | 5/2002 | Bakalash et al. | 707/3 |
| 6,397,195 B1 | 5/2002 | Pinard et al. | |
| 6,405,208 B1 | 6/2002 | Raghavan et al. | |
| 6,421,665 B1 | 7/2002 | Brye et al. | |
| 6,480,848 B1 | 11/2002 | DeKimpe et al. | |
| 6,484,179 B1 | 11/2002 | Roccaforte | |
| 6,513,029 B1 | 1/2003 | Agrawal et al. | |
| 6,546,402 B1 | 4/2003 | Beyer et al. | |
| 6,553,366 B1 | 4/2003 | Miller et al. | |
| 6,601,062 B1 | 7/2003 | Deshpande et al. | |
| 6,615,203 B1 | 9/2003 | Lin et al. | |
| 6,629,102 B1 | 9/2003 | Malloy et al. | |
| 6,665,682 B1 | 12/2003 | DeKimpe et al. | |
| 6,691,301 B2 | 2/2004 | Bowen | |
| 6,701,311 B2 * | 3/2004 | Biebesheimer et al. | 707/5 |
| 6,721,760 B1 | 4/2004 | Ono et al. | 707/104.1 |
| 6,826,556 B1 | 11/2004 | Miller et al. | |
| 6,931,418 B1 | 8/2005 | Barnes | |
| 7,028,046 B2 | 4/2006 | Anjur et al. | |
| 7,152,073 B2 * | 12/2006 | Gudbjartsson et al. | 707/102 |
| 7,222,130 B1 * | 5/2007 | Cras et al. | 707/103 R |
| 7,324,991 B1 | 1/2008 | Anjur | |
| 7,337,163 B1 | 2/2008 | Srinivasan | |
| 7,366,730 B2 | 4/2008 | Greenfield et al. | |
| 7,467,127 B1 | 12/2008 | Baccash et al. | |
| 7,617,312 B2 | 11/2009 | Tummalapalli | |
| 7,734,652 B2 | 6/2010 | Tamayo | |
| 7,774,303 B2 | 8/2010 | Shoup | |
| 7,797,320 B2 | 9/2010 | Thomsen | |
| 8,001,112 B2 | 8/2011 | Dombroski et al. | |
| 8,200,612 B2 | 6/2012 | Soylemez | |
| 8,209,280 B2 | 6/2012 | Kearney et al. | |
| 2001/0054034 A1 * | 12/2001 | Arning et al. | 707/1 |
| 2002/0091681 A1 | 7/2002 | Cras et al. | |
| 2002/0091707 A1 | 7/2002 | Keller | |
| 2002/0126545 A1 * | 9/2002 | Warren et al. | 365/200 |
| 2002/0184187 A1 | 12/2002 | Bakalash et al. | |
| 2003/0084053 A1 | 5/2003 | Govrin et al. | |
| 2003/0208506 A1 | 11/2003 | Greenfield et al. | |
| 2004/0215626 A1 | 10/2004 | Colossi et al. | 707/100 |
| 2004/0236767 A1 | 11/2004 | Soylemez et al. | |
| 2005/0004904 A1 | 1/2005 | Kearney et al. | 707/3 |
| 2005/0033741 A1 | 2/2005 | Dombroski et al. | |

OTHER PUBLICATIONS

Theodore Johnson et al., "Extending Complex Ad-Hoc OLAP," CIKM, ACM, 1999, 10 pages.

Microsoft, HOWTO:SQL Server 7 Distributed Query with OLAP Server, Jul. 2000, (available at http://86.83.48.191/Shared%20Documents/sgl/olap/distqry.htm ), 2 pages.

* cited by examiner

EFFICIENT PROCESSING OF RELATIONAL JOINS OF MULTIDIMENSIONAL DATA

CROSS REFERENCE TO RELATED APPLICATIONS

This application is a continuation-in-part of U.S. patent application Ser. No. 10/841,941 entitled "Efficient SQL Access To Multidimensional Data", filed May 6, 2004, now U.S. Pat. No. 8,200,612 which claims the benefit of priority under 35 U.S.C. §119(e) from U.S. Provisional Application No. 60/469,032 entitled "Techniques for Managing Multidimensional Data in a Relational Database Management System (RDBMS)", filed May 7, 2003, the disclosures of both of which are incorporated by this reference in their entirety for all purposes as if fully set forth herein.

FIELD OF THE INVENTION

The present invention relates generally to database systems and, more specifically, to techniques for efficient processing of relational joins of multidimensional data.

BACKGROUND OF THE INVENTION

In the context of database systems, a "dimension" is a list of values that provide categories for data. A dimension acts as an index for identifying values of a variable. For example, if sales data has a separate sales figure for each month, then the data has a MONTH dimension. That is, the data is organized, or "dimensioned", by month. A dimension is similar to a key in a relational database. Data that is organized by two or more dimensions is referred to as "multidimensional data".

Any item of data within a multidimensional variable can be uniquely and completely selected by specifying one member from each of the variable's dimensions. For example, if a sales measure is dimensioned by MONTH, PRODUCT, and MARKET, specifying "January" for the MONTH dimension, "Stereos" for the PRODUCT dimension, and "Eastern Region" for the MARKET dimension uniquely specifies a single value of a measure. A multidimensional variable (e.g., a measure) can be conceptually thought of as an N-dimensional array, where N is the number of dimensions of the variable, and where each value in the array may be accessed by specifying one dimension key value for each dimension (e.g. MDVar(dim1, dim2, dim3, . . . , dimN)). Thus, dimensions offer a concise and intuitive way of organizing and selecting data for retrieval, updating, and performing calculations.

Multidimensional arrays with 2 and 3 dimensions may be depicted visually as grids and cubes, respectively. For convenience, it has become customary to refer to the conceptual multidimensional arrays that correspond to multidimensional variables as "multidimensional cubes" (or simply "cubes") regardless of how many dimensions they possess. Hence, a multidimensional data cube is a set of n-dimensional data objects. Further, each multidimensional value is said to belong to a "cell" of the cube, where the address of the cell is the set of dimension key values (one per dimension) that correspond to the multidimensional value contained therein.

For the purpose of explanation, the multidimensional value that belongs to a cell shall be referred to as the "cell value" of that cell. Cell values are associated with types of data, i.e., measures, on which a function is executed, such as a summation function, average function, minimum value function, maximum value function, and the like. For example, a cell might contain a value representing a summation of sales in dollars for a particular product in a particular time period in a particular market, where "sales" is the measure.

Multidimensional data may be stored in relational database management systems ("RDBMS") or in specialized, "multidimensional" database management systems ("MDDBMS"), according to a multidimensional schema. MDDBMSs provide structures and access techniques specifically designed for multidimensional data, and therefore provide relatively efficient storage and access to multidimensional data. However, when stored in specialized MDDBMSs, only applications that are specially built to interact with those systems are able to access and manipulate the data. This is because the commands sent to the MDDBMSs have to conform to the command language supported by the MDDBMS.

When multidimensional data is stored in RDBMSs, all applications that support interaction with relational databases have access to the data. Such database applications communicate with the RDBMS by submitting commands that conform to the database language supported by the RDBMS, the most common of which is the ANSI Structured Query Language (SQL). According to one approach, multidimensional data may be stored in a MDDBMS, but accessed by sending SQL to a RDBMS. In this approach, the RDBMS interacts with the MDDBMS to access the data from the MDDBMS.

Database statements (e.g., SQL queries) often include predicates (e.g., WHERE clause conditions) that limit the domain of records that are returned in response to the query. A query optimizer executing in the RDBMS may attempt to identify predicates that can be logically applied to other parts of the query in order to reduce the amount of data that is returned. However, the relational optimizer is unable to apply such techniques in the multidimensional data space because the optimizer simply does not understand the inherent structure of, and thus the extraction process for, the multidimensional data.

The "domain" of a query or subquery on multidimensional data is defined by the dimensionally-limited subset of data objects with which the query is concerned. For example, from 32 available products in the PRODUCT dimension, a particular query may only be concerned with 5 of those products. Therefore, those 5 products represent the "domain" of the PRODUCT dimension relative to that query.

The status information maintained for a session reflects the domain that is applied to queries and subqueries executed within the session. However, a single session may have multiple queries and/or subqueries, each of which may have different domains for the same dimensions. Unfortunately, a change made to the session status caused by one query (to reflect the domain of that query) may adversely affect a concurrently executing query or subquery within the same session. Thus, concurrently executing multiple queries and subqueries within the same session may adversely affect the database system's ability to maintain read consistency throughout the session.

Based on the foregoing, there is room for improvement in techniques for efficiently and correctly processing queries on multidimensional data through a RDBMS.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
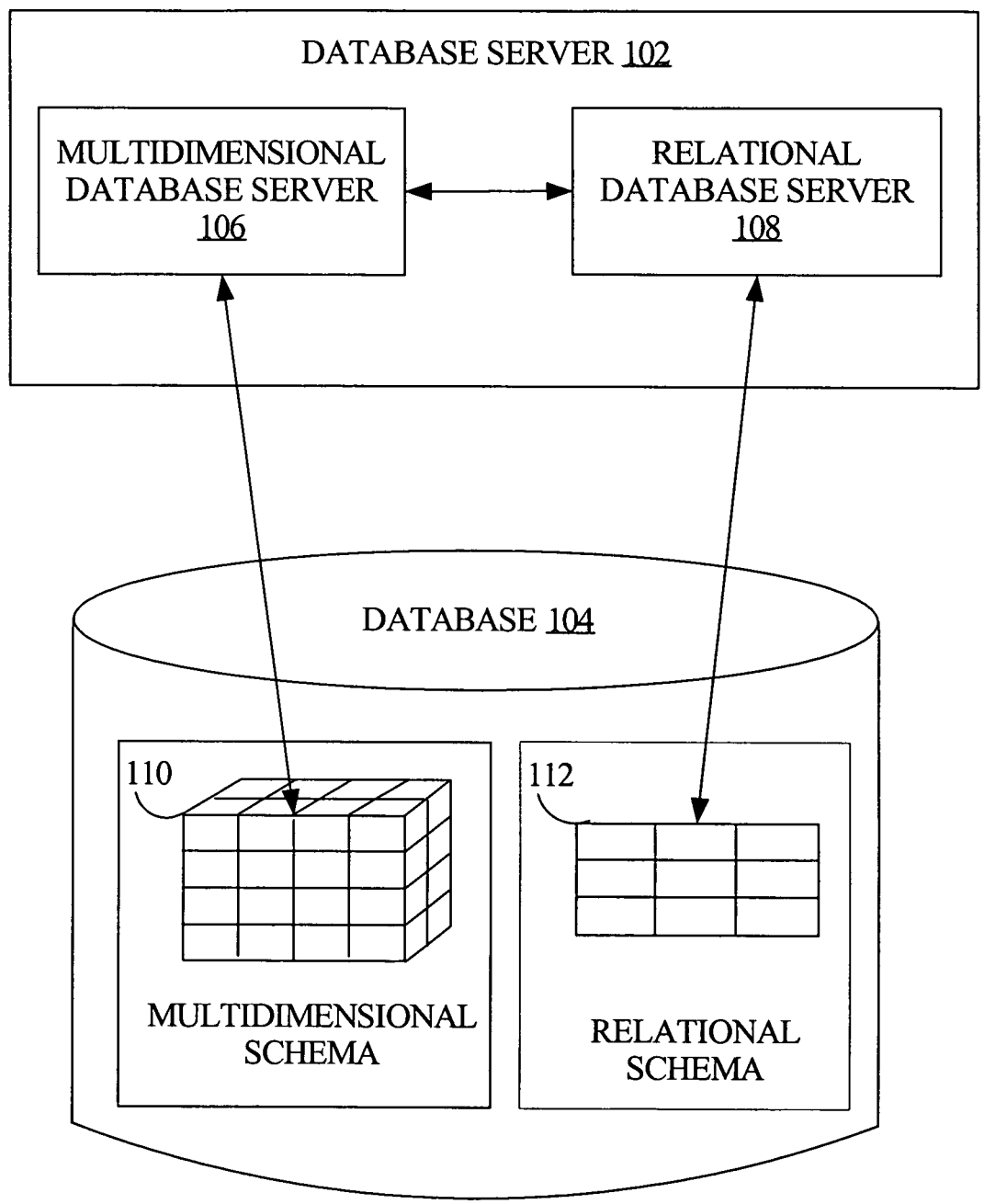
FIG. 1 is a block diagram that illustrates an operating environment in which an embodiment of the invention may be implemented.

In the following description, for the purposes of explanation, numerous specific details are set forth in order to provide a thorough understanding of embodiments of the invention. It will be apparent, however, that embodiments of the invention may be practiced without these specific details. In other instances, well-known structures and devices are shown in block diagram form in order to avoid unnecessarily obscuring embodiments of the invention.

Functional Overview of Embodiments

One aspect of the invention involves a technique referred to herein as "predicate abduction." Predicate abduction involves identifying, from a database statement, predicates (i.e., conditions) on attributes of dimensional data, and applying those predicates to corresponding measure data as the measure data is extracted by a multidimensional database server from underlying multidimensional data objects. The result is that only measure values associated with dimension values that satisfy the condition are fetched and returned by the multidimensional database server. This technique takes advantage of an inherent characteristic of multidimensional data objects, i.e., that measure data and dimensional data is effectively "pre-joined". In other words, the measure data is "dimensioned" by one or more particular dimensions. Hence, all of the measure data does not need to be read from the multidimensional data objects to determine which values to fetch, because determining which dimensional data satisfies the dimensional attribute condition effectively also determines which measure data is needed to complete execution of the database statement.

For example, if a database statement requests the number of sales of widgets priced over $100 (where the condition on a PRODUCT dimension is that the price attribute has a value greater than $100), a determination is made as to which products' price attribute is greater than $100, and the sales measure value is returned by the multidimensional database server only for each of those products whose price attribute is greater than $100. In contrast to processing relational joins of relational data, the subset of the measure data is determined by the multidimensional database server without the relational database server needing to join a fact table with a dimension table and, therefore, without the relational database server processing every fact record to determine which measure values are associated with widgets, from the PRODUCT dimension, whose price is greater than $100.

One aspect of the invention involves storing, in respective buffers, the multidimensional data extracted from multidimensional objects, when the query calls for the same multidimensional data to be extracted multiple times. For example, in response to detecting that execution of a database statement requires multiple iterations of extracting the same multidimensional data from multidimensional data objects, the multidimensional data is extracted during the first iteration and stored in a buffer. Hence, for each subsequent iteration, the data in the buffer is accessed rather than again extracting the data from the multidimensional objects. Thus, in a stateful system in which a session's state information affects which multidimensional data is extracted, and in which the state information changes between the first iteration and a subsequent iteration, the buffered data can be accessed such that the change in the state does not affect the data used for subsequent iterations.

Operating Environment

FIG. 1 is a block diagram that illustrates an operating environment in which an embodiment of the invention may be implemented.

The operating environment includes a database server 102 and a database 104. Database server ("server") 102 comprises a combination of integrated software components and an allocation of computational resources (such as memory and processes) for executing the integrated software components on one or more processors, where the combination of the software and computational resources are used to manage a particular database on behalf of clients of the server. Among other functions of database management, a database server 102 governs and facilitates access to a particular database, such as database 104, by processing requests by clients to access the database.

Database server 102 comprises a multidimensional database server 106, which is a server module that is specially built to interact with multidimensional data in a multidimensional schema, such as multidimensional data represented as cube 110. Multidimensional database server 106 is able to interpret the multidimensional data, which, in one embodiment, is stored as one or more BLOBs in a relational database table. Based on techniques described herein, multidimensional database server 106 manages extraction and manipulation of multidimensional data from database 104, for presentation to relational database server 108.

Database server 102 comprises a relational database server 108, which is a server module that parses, interprets and manages execution of database statements on database 104. In one embodiment, relational database server 108 comprises a SQL processor that parses, interprets and manages execution of data queries and/or operations embodied in SQL statements. Relational database server 108 can directly access and operate on data in one or more relational table 112, and can access and operate on data stored in one or more multidimensional cubes 110 via multidimensional database server 106.

During processing of a database statement, relational database server 108 can request multidimensional data (e.g., from cube 110) and receive a return set of multidimensional data from multidimensional database server 106. The relational database server 108 may perform further query and manipulation operations on the result data set returned by the multidimensional database server 106, based on conventional relational SQL statements and/or relational DML operations, either during the same session with database 104 or during another session with database 104 if the result set is persistently stored in the database.

Database 104 is communicatively coupled to server 102 and is a repository for storing data and metadata on a persistent memory mechanism, such as a set of hard disks. Such data and metadata may be stored in database 104 logically, for example, according to relational schema, multidimensional schema, or a combination of relational and multidimensional schema.

Database 104 includes a multidimensional schema for one or more multidimensional cubes 110, which is an abstract data construct that represents multidimensional data. Database 104 also includes a relational schema for storing relational database tables, such as table 112. Table 112 may store, for example, relationally managed base data as well as pre-computed aggregated data. In one embodiment, database 104 stores both multidimensional cubes 110 and relational tables 112. Hence, in such an embodiment, database 104 and database server 102 are part of a relational database management system (RDBMS) that provides structures and access techniques designed for multidimensional data and structures and access techniques designed for relational data. Therefore, the RDBMS is capable of storing, managing and manipulating relational and multidimensional data.

However, embodiments are not limited to an operating environment in which both the multidimensional schema and the relational schema are integrated into a common database 104, as depicted in FIG. 1. Rather, in one embodiment, the multidimensional schema and the relational schema are associated with separate databases that are both ultimately accessible via relational database server 102. In addition, embodiments are not limited to an operating environment in which both the multidimensional database server 106 module and the relational database server 108 module are integrated into a common database server 102, as depicted in FIG. 1. Rather, in one embodiment, the multidimensional database server 106 and the relational database server 108 are separate servers that are communicatively coupled to each other.

The techniques described herein allow multidimensional data to be accessed via a relational database statement, such as a SQL statement, where the multidimensional data is structured according to a multidimensional schema. According to one embodiment, the multidimensional schema makes use of analytic workspaces. An analytic workspace is a storage type that provides multidimensional structures that are compatible with n-dimensional database objects such as dimensions, variables, formulas, relations, and valuesets. Analytic workspaces can persist across sessions and can be shared by multiple user sessions. In effect, multidimensional data objects in an analytic workspace are "pre-joined", such that measure data is "dimensioned" by one or more particular dimensions with which the measure data shares keys.

The techniques described herein may be implemented to manage multidimensional data stored in an analytic workspace construct. These techniques can be employed to extract and manipulate, by a multidimensional database server, multidimensional data stored in a relational database according to a multidimensional schema.

Multidimensional Schema

SQL-based applications can request multidimensional data from n-dimensional data objects. In an object-relational database system, two mechanisms in the database's construction assist in facilitating such requests: object types and table functions.

An object type encapsulates a data structure along with the functions and procedures needed to manipulate the data contained therein. The individual elements of the data structure are referred to as properties. With multidimensional data, the "real-world objects" that correspond to the properties of an object type are measures, dimensions, hierarchies, attributes, and the like. By defining object types for groupings of objects in an analytic workspace, and then defining result sets in the form of virtual return tables, or views, for these objects, the format of multidimensional data is described as rows and columns to a relational database server 108 (FIG. 1), e.g., to a SQL processor of a relational database server.

One way to request multidimensional data, from multidimensional data objects, that is stored according to a multidimensional schema is to use a table function. Table functions produce a collection of rows that can be queried like a database table. For example, a table function is used instead of a database table name in the FROM clause of a SQL query. Table functions can be used to fetch data from multidimensional data objects. If table functions are used in conjunction with relational views, the multidimensional source of the data is transparent to SQL-based applications, which can then use standard SQL statements to run against the views of the multidimensional data just as applications access other relational tables and views in the relational schema.

One approach to providing management of multidimensional data using a table function is described in U.S. patent application Ser. No. 10/841,941 entitled "Efficient SQL Access To Multidimensional Data", the content of which is incorporated by reference in its entirety for all purposes as if fully set forth herein. A particular table function that may be used to implement embodiments described in the reference is referred to therein as the OLAP_TABLE function.

Predicate Abduction

The technique referred to as "predicate abduction" is a pre-processing optimization technique performed, for example, by a multidimensional database server in response to a database statement that involves multidimensional data objects. Generally, predicate abduction involves (1) identifying, from a database statement, predicates (i.e., conditions) on attributes of dimensional data, and (2) applying those predicates to corresponding measure data so that only measure data associated with dimension values that satisfy the condition are fetched and returned by the multidimensional database server. Hence, all of the measure data does not need to be read to determine which values to fetch, because determining which dimensional data satisfies the dimensional attribute condition effectively also determines which measure data is needed to complete execution of the database statement.

According to a multidimensional schema, data objects share dimensions. That is, the data objects share a common key that reference common indices. For example, a subset of a set of products, as well as a subset of a set of sales values, can both be identified based on the same one or more product keys, i.e., keys from the product dimension. Because measure data is dimensioned by dimension data (according to the multidimensional schema but not the relational schema), a predicate on a dimension attribute can be abducted and applied to the measure data, thus providing an efficient process for relational join operations on multidimensional data. Furthermore, in scenarios in which multiple different measures (e.g. first measure and second measure) are dimensioned by the same dimension, a predicate specified on a dimension attribute in association with the first measure can be abducted and applied to the measure data associated with the second measure.

Process for Retrieving Multidimensional Data

Figure 2:
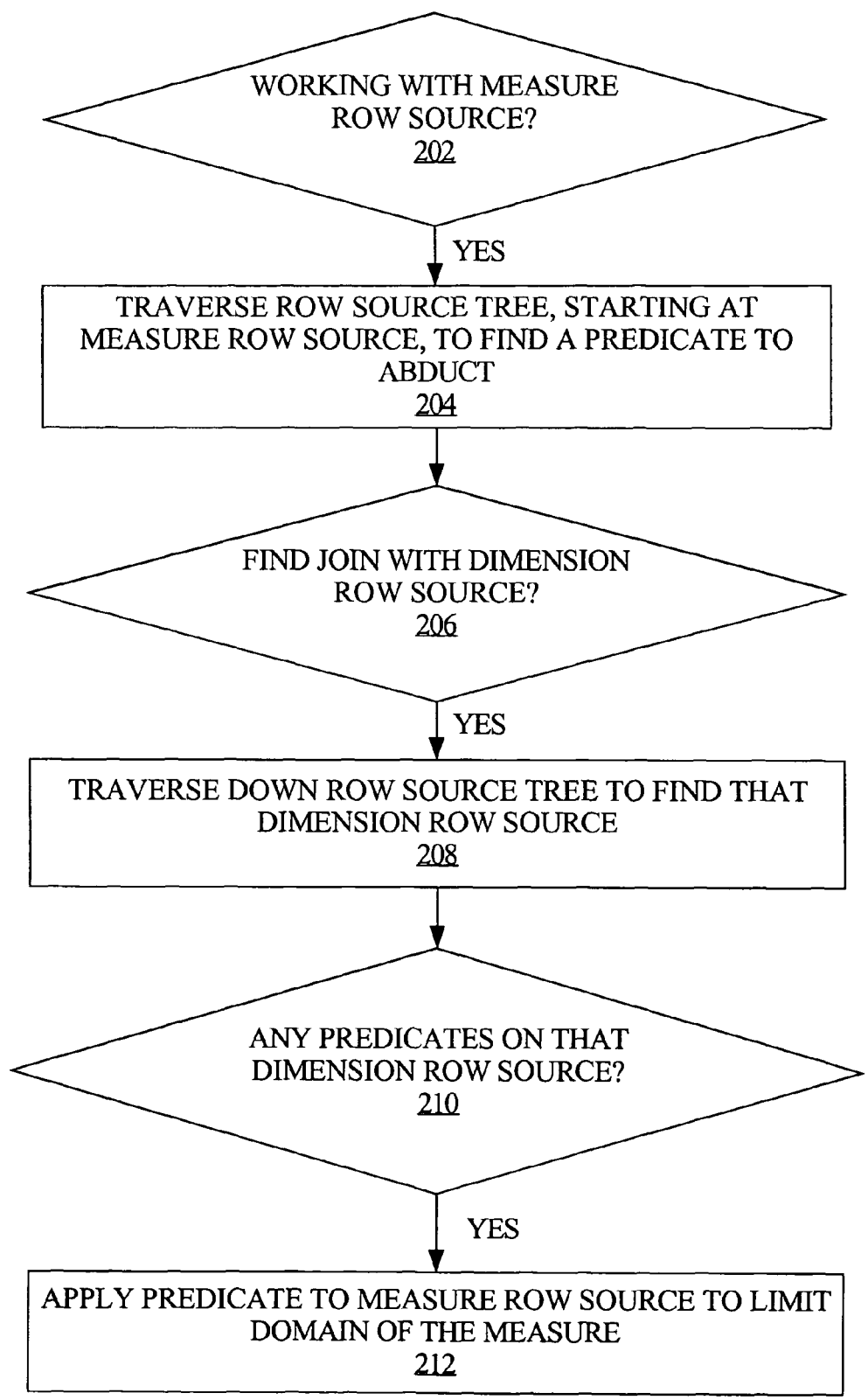
FIG. 2 is a flow diagram that illustrates a process for retrieving multidimensional data that is structured according to a multidimensional schema, according to one embodiment of the invention.

FIG. 2 is a flow diagram that illustrates a process for retrieving multidimensional data that is structured according to a multidimensional schema, according to one embodiment of the invention. A multidimensional database server, such as multidimensional database server 106 (FIG. 1), independently or in conjunction with a relational database server, such as relational database server 108 (FIG. 1), may perform this process. The process illustrated in FIG. 2 is one possible manner of implementing broader techniques described herein. However, implementation of such techniques may vary.

In response to receiving a database statement, i.e., a query, the query is compiled. During the compilation process, the query is decomposed into its constituent parts. The smallest constituent parts of the query are referred to as "row sources". Each row source corresponds to an operation that produces rows. The process illustrated in FIG. 2 is performed in the context of traversing a row source tree to extract multidimensional data from multidimensional data objects, in response to a database statement. A row source tree is the core of a database query execution plan, where a query's execution plan is the sequence of operations performed to run the query. A row source tree typically includes the following information: (a) an ordering of the data sources referenced by the query; (b) an access method for each data source mentioned in the query; (c) a join method for data sources affected by join operations in the query; and (d) data operations like filter, sort, or aggregation.

At decision block 202, it is determined whether or not the current process is working with a measure row source. For example, when a table function is included in a database statement and, consequently, a call is made to the multidimensional server to execute the function, the call includes contextual information from which a determination is made that the current row source is a measure row source. For example, the call may include the name of an associated relational object, from which it is determined by considering the associated relational object's attributes, that the current row source is a measure row source.

If the current row source is a measure row source, then at block 204 the row source tree is traversed, starting at the measure row source node (from block 202), in an attempt to identify a predicate to abduct for application to the measure row source. One manner in which to identify a predicate is to identify a join operation with a dimension row source. Hence, at decision block 206, a determination is made as to whether or not a join with a dimension row source is found in traversing up the row source tree from the measure row source node.

In one embodiment, attempting to identify a join with a dimension row source involves attempting to identify an equi-join of the measure row source and a dimension row source. This is because an equi-join often includes a predicate worthy of abduction and application to the measure row source. In one embodiment, attempting to identify an equi-join includes looking for a hash join because the hash-join node contains sufficient, and proper, information to identify the join as an equi-join.

If a join between the measure row source and a dimension row source is identified from the row source tree, then at block 208 the row source tree is traversed down to the joined dimension row source node. In one embodiment, a verification routine is performed to verify that this dimension row source is the one that is joined with the measure row source. Then, at decision block 210, a determination is made as to whether or not there are any predicates on that dimension row source, which can be determined from the dimension row source node.

If one or more predicates on the dimension are identified, then at block 212 the dimension predicate is applied to, or executed on, the measure row source to limit the domain of the measure. For example, if the predicate is on the price attribute of the PRODUCT dimension (e.g., WHERE product.price>100), then only measure data associated with dimension values, for the price attribute, that satisfy the predicate (e.g., products that are priced greater than $100) are returned by the multidimensional database server during execution of the measure row source. Consequently, not as much measure data has to be pushed up the row source tree (e.g., maintained and processed) during the subsequent execution of the database statement. This technique provides an efficient mechanism for performing join operations on multidimensional data stored in multidimensional data objects.

Once the process illustrated in FIG. 2 is completed, then the process can be started in the context of other row source nodes. Furthermore, if the output from any of decision blocks 202, 206 or 210 is negative, then the process can be started in the context of another row source node.

In one embodiment, a process is performed to recognize and abduct predicates on each of multiple dimensions that are joined with a given measure, where application of the multiple predicates to the associated measure row source limits the domain of the measure to the intersection of the multiple dimension values that satisfy the respective predicates. As such, the data returned from the measure row source is limited to only the measure data associated with dimension values, for the predicated attributes of the multiple dimensions, that satisfy all the predicates associated with the respective dimensions. Furthermore, any one dimension that is joined with a given measure may have multiple predicates thereon, where application of the multiple predicates to the associated measure row source limits the domain of the measure to the intersection of the multiple dimension values, for the predicated attributes of the dimensions, that satisfy all the predicates on that one dimension.

Buffer Reuse

One aspect of the invention involves storing, in respective buffers, the results of certain extraction operations executed on multidimensional data. For example, in response to detecting that execution of a database statement requires multiple iterations of extracting the same multidimensional data from multidimensional data objects (e.g., execution of a table function in an inner nest of a nested loop join), the multidimensional data is extracted during the first iteration and stored in a buffer. Hence, for each subsequent iteration, the data in the buffer is accessed, rather than extracting the same data again from the multidimensional objects.

Storing the extracted data in this manner reduces the cost of the subsequent iterations that would extract the same data. In addition, buffer reuse is particularly beneficial in stateful systems in which state information (such as the session status) affects which multidimensional data is extracted from multidimensional data objects, and in which the state information may be changed by another query or subquery within the same session. If the session status changes between the first iteration and some subsequent iteration, the multidimensional data that is stored in the buffer can be accessed during iterations subsequent to the state change. Therefore, multidimensional data based on the new state is not extracted from the multidimensional data objects for processing in the iterations subsequent to the state change, so that the data processed in the subsequent iterations does not differ from the data processed in the first iteration.

A stateful system may operate in accordance with a session-wide state, and also in a manner in which any query executing during the session is able to change the current session-wide state. For example, concurrently executing queries within a given session, or concurrently executing subqueries within a given query, may each change the state of the system to their respective domains, thereby extracting different multidimensional data for processing. Such a scenario could lead to corrupt results from some of the concurrently executing queries or subqueries to which the current domain does not apply. In contrast, by buffering the data associated with the queries, the queries are effectively insulated from session-wide domain changes, and read consistency is provided to each query for the duration of each query.

In the "buffer reuse" technique described above, a multidimensional database server, such as multidimensional database server 106 (FIG. 1), recognizes situations in which an extraction operation will be repeated (e.g., recognizes that a query calls for multiple executions of a table function that specifies extraction of particular multidimensional data) and performs a single data extraction process from the multidimensional data objects. In one embodiment, the multidimensional data is then stored in a buffer by the multidimensional database server and subsequently accessed by the multidimensional database server during subsequent iterations of the same extraction operation. For example, in the context of multiple executions of a particular table function, the multidimensional database server reuses the buffer by storing into the buffer once, and accessing from the buffer the extracted multidimensional data multiple times.

In another embodiment, after the multidimensional database server extracts the multidimensional data, the multidimensional data is then stored in a buffer and subsequently accessed by a relational database server, such as relational database server 108 (FIG. 1). Even though the relational database server is not necessarily concerned with the state of the multidimensional database server session, the relational server can benefit from buffering data returned by the multidimensional server. For example, in the context of multiple executions of a table function that is within a query loop that is executed by the relational database server, the relational database server may reuse the buffer by storing the extracted multidimensional data in a buffer and accessing the buffered data as required to execute each loop. This buffer reuse by the relational server could be in addition to buffer reuse by the multidimensional server.

Hardware Overview

Figure 3:
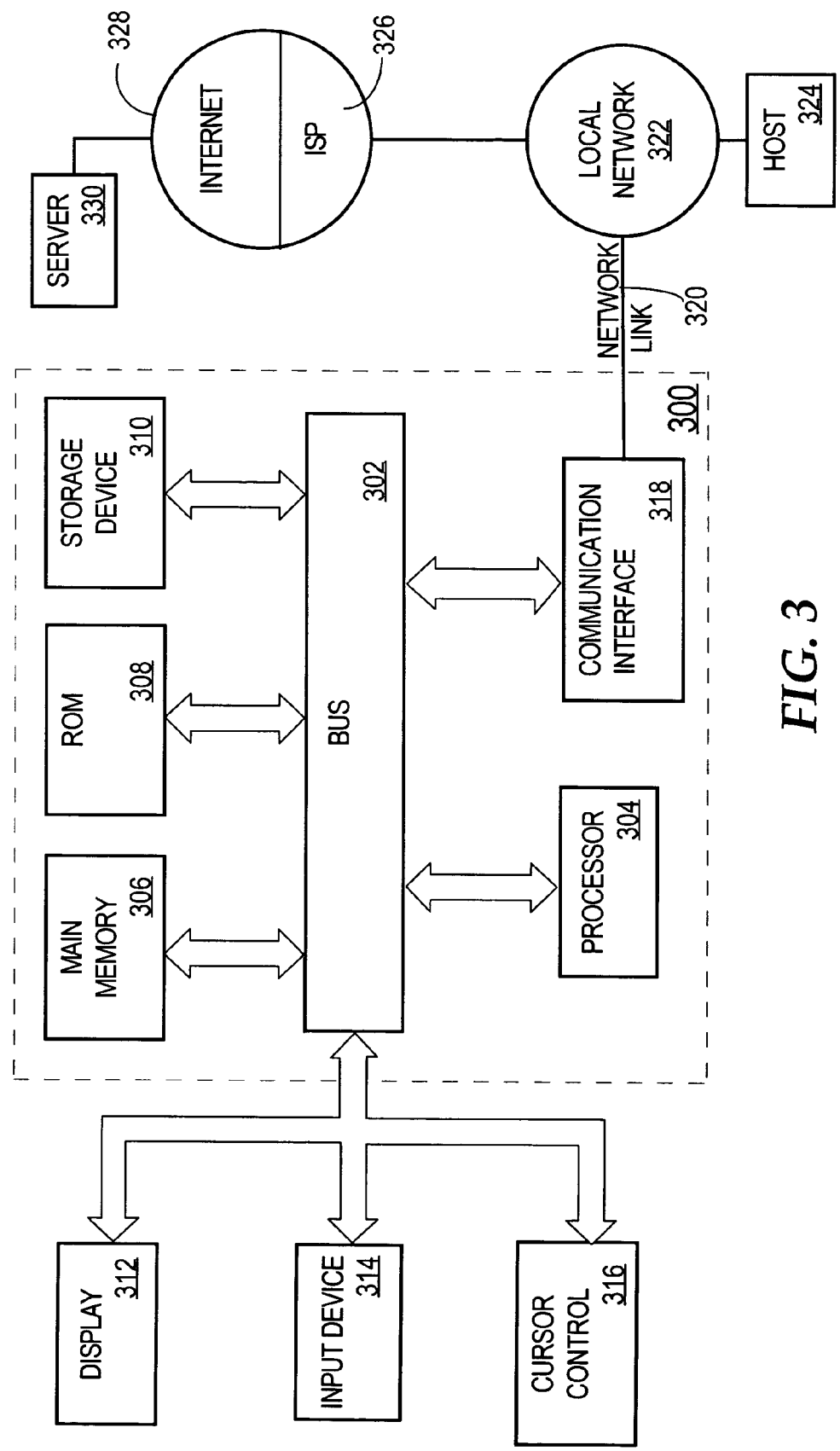
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising the computer-implemented steps of:
   receiving, at a relational database server, a database statement that involves one or more multidimensional data objects in a multidimensional schema;
   determining that a plurality of operations need to be performed to execute the database statement, the plurality of operations including:
     a first operation that requires a multidimensional database server to retrieve particular measure data from the one or more multidimensional data objects and to provide the particular measure data to the relational database server, wherein the particular measure data is dimensioned by a particular dimension, and
     a second operation, to be performed by the relational database server, that specifies a condition on a dimension attribute of the particular dimension, wherein values of the dimension attribute do not affect where, within the one or more multidimensional data objects, the particular measure data is located; and
   during performance of the first operation, the multidimensional database server performing the step of:
     returning a subset of the particular measure data from the one or more multidimensional data objects to the relational database server by only returning, to the relational database server, measure data associated with dimension values, for the dimensiion attribute, that satisfy the condition on the dimension attribute, wherein the subset that is returned by the multidimensional database server to the relational database server includes less than all of the particular measure data;

wherein the steps are performed by one or more computing devices.

2. The method of claim 1, wherein the step of determining that a plurality of operations need to be performed comprises:
   identifying an equi-join operation on (a) the particular measure data that is dimensioned by the particular dimension and (b) dimensional data associated with the particular dimension; and
   identifying the condition on the dimension attribute of the particular dimension.

3. The method of claim 1, further comprising the computer-implemented steps of:
   determining that the particular measure data is dimensioned by more than one particular dimension;
   determining that the database statement includes a condition on a respective dimension attribute of more than one of the particular dimensions; and
   wherein the step of returning comprises returning the subset of the particular measure data from the one or more multidimensional data objects by only returning measure data associated with dimension values, for each of the respective dimension attributes, that satisfy the condition on the respective dimension attribute.

4. The method of claim 1, further comprising the computer-implemented steps of:
   determining that the database statement includes conditions on more than one dimension attribute of the particular dimension; and
   wherein the step of returning comprises returning the subset of the particular measure data from the one or more multidimensional data objects by only returning measure data associated with dimension values, for each of the respective more than one dimension attributes, that satisfy the condition on the respective more than one dimension attributes.

5. The method of claim 1,
   wherein the first operation to retrieve particular measure data is an operation to retrieve first measure data that is associated with a first measure and second measure data that is associated with a second measure that is different from the first measure;
   wherein the second operation specifies the condition on the dimension attribute in association with the first measure; and
   wherein the step of returning the subset of the particular measure data includes returning only first and second measure data that is associated with dimension values, for the dimension attribute, that satisfy the condition on the dimension attribute of the particular dimension.

6. The method of claim 1, further comprising:
   compiling the database statement to generate a row source tree that comprises one or more measure row sources and one or more dimension row sources;
   determining which measure data, corresponding to the dimension attribute,
     satisfies the condition includes:
     identifying a particular measure row source in the row source tree;
     in response to identifying the particular measure row source, traversing, starting at the particular measure row source, the row source tree;
     while traversing the row source tree, identifying a join between the particular measure row source and a particular dimension row source;
     in response to identifying the join, traversing down the row source tree;

while traversing down the row source tree, identifying a predicate on the particular dimension row source; and in response to identifying the predicate, applying the predicate to the particular measure row source.

7. A method comprising the computer-implemented steps of:

receiving a single database statement that involves one or more multidimensional data objects;

executing the single database statement, wherein executing the single database statement includes:

determining that the single database statement specifies multiple, distinct performances of a particular operation on particular multidimensional data from the one or more multidimensional data objects;

in response to a first specification of the particular operation within the single database statement, a multidimensional database server performing the particular operation;

storing results of the particular operation in a buffer; and in response to a second specification of the particular operation within the single database statement, retrieving the results of the particular operation from the buffer without the multidimensional database server again performing the particular operation;

wherein the steps are performed by one or more computing devices.

8. The method of claim 7, wherein the single database statement specifies (a) at least one operation on a first set of data from the one or more multidimensional data objects and (b) at least one other operation on a second set of data, with a different dimensional domain than the first set of data, from the one or more multidimensional data objects;

wherein the first set of data and the second set of data are different;

the method further comprising the computer-implemented steps of:

retrieving the first set of data from the one or more multidimensional data objects, storing the first set of data in a first buffer;

while concurrently executing the at least one operation and the at least one other operation, retrieving the second set of data from the one or more multidimensional data objects, and storing the second set of data in a second buffer that is different from the first buffer; and completing execution of the at least one operation based on the first set of data in the first buffer.

9. The method as recited in claim 7 wherein said particular operation comprises a first operation, said method further comprising:

performing a second operation according to the single database statement that specifies a condition on a dimension attribute of a particular dimension that dimensions measure data from the one or more multidimensional data objects; and wherein the particular first operation comprises:

returning a subset of the measure data from the one or more multidimensional data objects to a relational database server by only returning, to the relational database server, measure data associated with dimension values, for the attribute, that satisfy the condition on the dimension attribute.

10. A method comprising the steps of:

receiving a single query that requires extraction of multidimensional data from one or more multidimensional data objects;

detecting that execution of the single query requires multiple iterations of extracting the same multidimensional data from the one or more multidimensional data objects;

in response to detecting that execution of the single query requires multiple iterations of extracting the same multidimensional data from the one or more multidimensional data objects, performing the steps of:

a multidimensional database server extracting the multidimensional data during a first iteration of the multiple iterations;

storing the multidimensional data in a buffer separate from the one or more multidimensional data objects; and for each subsequent iteration of the multiple iterations, accessing the multidimensional data in the buffer rather than the multidimensional database server extracting the multidimensional data from the one or more multidimensional data objects;

wherein the steps are performed by one or more computing devices.

11. The method of claim 10, wherein:

state information affects which multidimensional data is extracted from the one or more multidimensional objects;

state information changes between the first iteration and one of the subsequent iterations; and during the subsequent iterations, accessing the multidimensional data from the buffer rather than extracting the multidimensional data from the one or more multidimensional data objects, wherein a change in the state information does not cause the multidimensional data that is accessed during the subsequent iterations to differ from the multidimensional data used during the first iteration.

12. The method of claim 11, wherein:

the single query is received in a session;

the state information is part of a session state of the session; and the session state of the session changes between the first iteration and one of the subsequent iterations.

13. The method of claim 12, wherein the session state changes in response to a concurrently executing query within the session.

14. The method of claim 12, wherein:

the multiple iterations are associated with a first subquery of the single query; and the session state changes in response to concurrent execution of a second subquery of the single query.

15. The method of claim 12, wherein the session state specifies a domain associated with said one or more multidimensional data objects; and wherein the domain constrains one or more dimensions of the one or more multidimensional data objects.

16. The method of claim 10, wherein:

the single query includes a table function that requires extraction of multidimensional data from the one or more multidimensional data objects; and the step of detecting that execution of the single query requires multiple iterations of extracting the same multidimensional data from the one or more multidimensional data objects includes detecting that execution of the single query requires multiple executions of the table function.

17. The method of claim 10, wherein
the step of receiving the single query is performed by a relational database server; and
the step of extracting the multidimensional data during the first iteration is performed by the multidimensional database server in response to commands from the relational database server.

18. The method of claim 17, wherein the steps of storing the multidimensional data in a buffer and accessing the multidimensional data in the buffer are performed by the relational database server.

19. The method of claim 17, wherein the steps of storing the multidimensional data in a buffer and accessing the multidimensional data in the buffer are performed by the multidimensional database server.

20. The method as recited in claim 10 wherein extracting the multidimensional data comprises:
performing an operation according to the single query that specifies a condition on a dimension attribute of a particular dimension that dimensions measure data from the one or more multidimensional data objects; and
wherein the operation according to the single query that specifies a condition on the dimension attribute comprises:
returning a subset of the measure data from the one or more multidimensional data objects to a relational database server by only returning, to the relational database server, measure data associated with dimension values, for the attribute, that satisfy the condition on the dimension attribute.

21. One or more non-transitory computer-readable media storing instructions which, when executed by one or more processors, cause:
receiving, at a relational database server, a database statement that involves one or more multidimensional data objects in a multidimensional schema;
determining that a plurality of operations need to be performed to execute the database statement, the plurality of operations including:
a first operation that requires a multidimensional database server to retrieve particular measure data from the one or more multidimensional data objects and to provide the particular measure data to the relational database server, wherein the particular measure data is dimensioned by a particular dimension, and
a second operation, to be performed by the relational database server, that specifies a condition on a dimension attribute of the particular dimension, wherein values of the dimension attribute do not affect where, within the one or more multidimensional data objects, the particular measure data is located; and
during performance of the first operation, the multidimensional database server performing the step of:
returning a subset of the particular measure data from the one or more multidimensional data objects to the relational database server by only returning, to the relational database server, measure data associated with dimension values, for the dimension attribute, that satisfy the condition on the dimension attribute, wherein the subset that is returned by the multidimensional database server to the relational database server includes less than all of the particular measure data.

22. The one or more non-transitory computer-readable media of claim 21,
wherein determining that a plurality of operations need to be performed comprises:
identifying an equi-join operation on (a) the particular measure data that is dimensioned by the particular dimension and (b) dimensional data associated with the particular dimension; and
identifying the condition on the dimension attribute of the particular dimension.

23. The one or more non-transitory computer-readable media of claim 21,
wherein the instructions, when executed by the one or more processors, further cause:
determining that the particular measure data is dimensioned by more than one particular dimension;
determining that the database statement includes a condition on a respective dimension attribute of more than one of the particular dimensions; and
wherein returning comprises returning the subset of the particular measure data from the one or more multidimensional data objects by only returning measure data associated with dimension values, for each of the respective dimension attributes, that satisfy the condition on the respective dimension attribute.

24. The one or more non-transitory computer-readable media of claim 21,
wherein the instructions, when executed by the one or more processors, further cause:
determining that the database statement includes conditions on more than one dimension attribute of the particular dimension; and
wherein returning comprises returning the subset of the particular measure data from the one or more multidimensional data objects by only returning measure data associated with dimension values, for each of the respective more than one dimension attributes, that satisfy the condition on the respective more than one dimension attributes.

25. The one or more non-transitory computer-readable media of claim 21,
wherein:
the first operation to retrieve particular measure data is an operation to retrieve first measure data that is associated with a first measure and second measure data that is associated with a second measure that is different from the first measure;
the second operation specifies a condition on a dimension attribute in association with the first measure; and
returning the subset of the particular measure data includes returning only first and second measure data that is associated with dimension values, for the dimension attribute, that satisfy the condition on the dimension attribute of the particular dimension.

26. The one or more non-transitory computer-readable media of claim 21,
wherein the instructions, when executed by the one or more processors, further cause:
compiling the database statement to generate a row source tree that comprises one or more measure row sources and one or more dimension row sources;
determining which measure data, corresponding to the dimension attribute, satisfies the condition includes:
identifying a particular measure row source in the row source tree;
in response to identifying the particular measure row source, traversing, starting at the particular measure row source, the row source tree;
while traversing the row source tree, identifying a join between the particular measure row source and a particular dimension row source;

in response to identifying the join, traversing down the row source tree;

while traversing down the row source tree, identifying a predicate on the particular dimension row source; and in response to identifying the predicate, applying the predicate to the particular measure row source.

27. One or more non-transitory computer-readable media storing instructions which, when executed by one or more processors, cause:

receiving a single database statement that involves one or more multidimensional data objects;

executing the single database statement, wherein executing the single database statement includes:

determining that the single database statement specifies multiple, distinct performances of a particular operation on particular multidimensional data from the one or more multidimensional data objects;

in response to a first specification of the particular operation within the single database statement, a multidimensional database server performing the particular operation;

storing results of the particular operation in a buffer; and in response to a second specification of the particular operation within the single database statement, retrieving the results of the particular operation from the buffer without the multidimensional database server again performing the particular operation.

28. The one or more non-transitory computer-readable media of claim 27, wherein:

the single database statement specifies (a) at least one operation on a first set of data from the one or more multidimensional data objects and (b) at least one other operation on a second set of data, with a different dimensional domain than the first set of data, from the one or more multidimensional data objects;

the first set of data and the second set of data are different;

the instructions, when executed by the one or more processors, further cause:

retrieving the first set of data from the one or more multidimensional data objects, storing the first set of data in a first buffer;

while concurrently executing the at least one operation and the at least one other operation, retrieving the second set of data from the one or more multidimensional data objects, and storing the second set of data in a second buffer that is different from the first buffer; and completing execution of the at least one operation based on the first set of data in the first buffer.

29. The one or more non-transitory computer-readable media of claim 27, wherein said particular operation comprises a first operation, wherein the instructions, when executed by the one or more processors, further cause:

performing a second operation according to the single database statement that specifies a condition on a dimension attribute of a particular dimension that dimensions measure data from the one or more multidimensional data objects;

wherein the particular first operation comprises:

returning a subset of the measure data from the one or more multidimensional data objects to a relational database server by only returning, to the relational database server, measure data associated with dimension values, for the attribute, that satisfy the condition on the dimension attribute.

30. One or more non-transitory computer-readable media storing instructions which, when executed by one or more processors, cause:

receiving a single query that requires extraction of multidimensional data from one or more multidimensional data objects;

detecting that execution of the single query requires multiple iterations of extracting the same multidimensional data from the one or more multidimensional data objects;

in response to detecting that execution of the single query requires multiple iterations of extracting the same multidimensional data from the one or more multidimensional data objects, performing the steps of:

a multidimensional database server extracting the multidimensional data during a first iteration of the multiple iterations;

storing the multidimensional data in a buffer separate from the one or more multidimensional data objects; and for each subsequent iteration of the multiple iterations, accessing the multidimensional data in the buffer rather than the multidimensional database server extracting the multidimensional data from the one or more multidimensional data objects.

31. The one or more non-transitory computer-readable media of claim 30, wherein:

state information affects which multidimensional data is extracted from the one or more multidimensional objects;

state information changes between the first iteration and one of the subsequent iterations; and during the subsequent iterations, accessing the multidimensional data from the buffer rather than extracting the multidimensional data from the one or more multidimensional data objects, wherein a change in the state information does not cause the multidimensional data that is accessed during the subsequent iterations to differ from the multidimensional data used during the first iteration.

32. The one or more non-transitory computer-readable media of claim 31, wherein:

the single query is received in a session;

the state information is part of a session state of the session; and the session state of the session changes between the first iteration and one of the subsequent iterations.

33. The one or more non-transitory computer-readable media of claim 32, wherein the session state changes in response to a concurrently executing query within the session.

34. The one or more non-transitory computer-readable media of claim 32, wherein:

the multiple iterations are associated with a first subquery of the single query; and the session state changes in response to concurrent execution of a second subquery of the sigle query.

35. The one or more non-transitory computer-readable media of claim 32, wherein:

the session state specifies a domain associated with said one or more multidimensional data objects; and the domain constrains one or more dimensions of the one or more multidimensional data objects.

36. The one or more non-transitory computer-readable media of claim 30,
wherein:
the single query includes a table function that requires extraction of multidimensional data from the one or more multidimensional data objects; and
detecting that execution of the single query requires multiple iterations of extracting the same multidimensional data from the one or more multidimensional data objects includes detecting that execution of the single query requires multiple executions of the table function.

37. The one or more non-transitory computer-readable media of claim 30,
wherein:
receiving the single query is performed by a relational database server; and
extracting the multidimensional data during the first iteration is performed by the multidimensional database server in response to commands from the relational database server.

38. The one or more non-transitory computer-readable media of claim 37,
wherein storing the multidimensional data in a buffer and accessing the multidimensional data in the buffer are performed by the relational database server.

39. The one or more non-transitory computer-readable media of claim 30, wherein storing the multidimensional data in he buffer and accessing the multidimensional data in the buffer are performed by the multidimensional database server.

40. The method as recited in claim 30, wherein extracting the multidimensional data comprises:
performing an operation according to the single query that specifies a condition on a dimension attribute of a particular dimension that dimensions measure data from the one or more multidimensional data objects; and
wherein the operation according to the single query that specifies a condition on the dimension attribute comprises:
returning a subset of the measure data from the one or more multidimensional data objects to a relational database server by only returning, to the relational database server, measure data associated with dimension values, for the attribute, that satisfy the condition on the dimension attribute.

* * * * *

UNITED STATES PATENT AND TRADEMARK OFFICE
CERTIFICATE OF CORRECTION

PATENT NO.        : 8,612,421 B2           Page 1 of 1
APPLICATION NO.   : 10/944169
DATED             : December 17, 2013
INVENTOR(S)       : Dombroski et al.

It is certified that error appears in the above-identified patent and that said Letters Patent is hereby corrected as shown below:

In the Claims

In column 11, line 63, in Claim 1, delete "dimensiion" and insert -- dimension --, therefor.

In column 18, line 60, in Claim 34, delete "sigle" and insert -- single --, therefor.

In column 20, line 5, in Claim 39, delete "30," and insert -- 37, --, therefor.

In column 20, line 6, in Claim 39, delete "he" and insert -- the --, therefor.

In column 20, line 9, in Claim 40, delete "The method as recited in" and
insert -- The one or more non-transitory computer-readable media of --, therefor.

Signed and Sealed this
Thirtieth Day of June, 2015

Michelle K. Lee
*Director of the United States Patent and Trademark Office*